United States Patent [19]
Chen et al.

[11] Patent Number: 5,341,779
[45] Date of Patent: Aug. 30, 1994

[54] BEAM FUNCTIONING FIRE RING

[75] Inventors: Colin Chen, Barrington; Hoover Oliver, Jr., LaGrange; Thomas Zurfluh, Evanston, all of Ill.

[73] Assignee: Fel-Pro Incorporated, Skokie, Ill.

[21] Appl. No.: 131,703

[22] Filed: Oct. 5, 1993

[51] Int. Cl.⁵ .............................................. F16J 15/06
[52] U.S. Cl. .................. 123/193.3; 277/235 B; 277/211
[58] Field of Search ............... 123/193.3, 193.5, 193.2; 277/235 B, 211, 207 R, 236, 207 A

[56]         References Cited
         U.S. PATENT DOCUMENTS

| | | | |
|---|---|---|---|
| 3,656,769 | 4/1972 | Jelinek et al. | 277/236 |
| 3,930,656 | 1/1976 | Jelinek | 277/207 A |
| 4,351,534 | 9/1982 | McDowell | 277/235 B |
| 4,518,168 | 5/1985 | Belter | 277/235 B |
| 4,796,897 | 1/1989 | Inciong | 277/211 |
| 5,267,740 | 12/1993 | Stritzke | 277/207 R |

*Primary Examiner*—Tony M. Argenbright
*Assistant Examiner*—M. Macy
*Attorney, Agent, or Firm*—Laff, Whitesel, Conte & Saret

[57]                ABSTRACT

A beam functioning fire ring mounted in main gasket body combustion openings straddles the block and cylinder liner of an internal combustion engine and seals combustion gases on the liner and liquids on the block. The fire ring may have a pair of combustion gas sealing feet on the liner and a single foot on the block. The thickness of the beam diminishes providing greater sealing stress against the liner and less sealing stress against the block where the sealing requirements are less stringent.

12 Claims, 2 Drawing Sheets

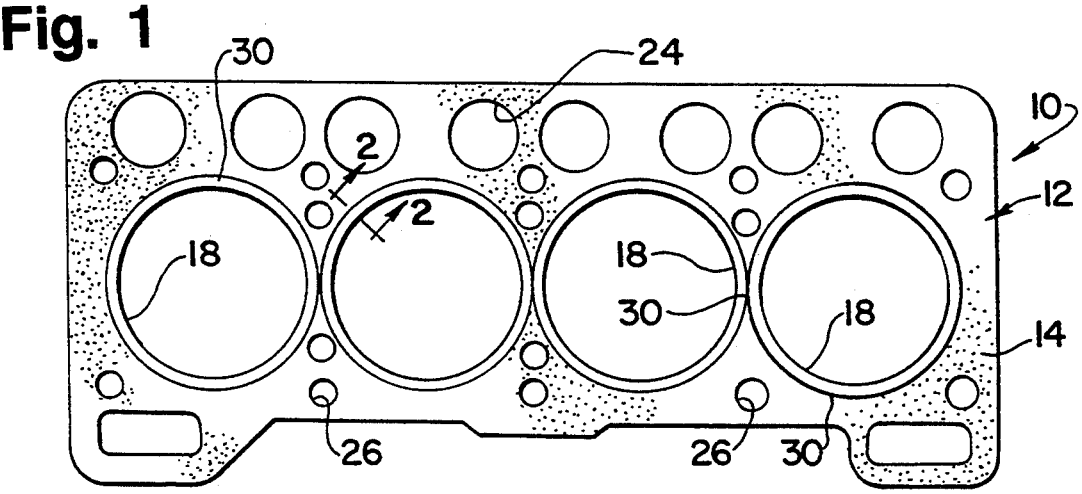
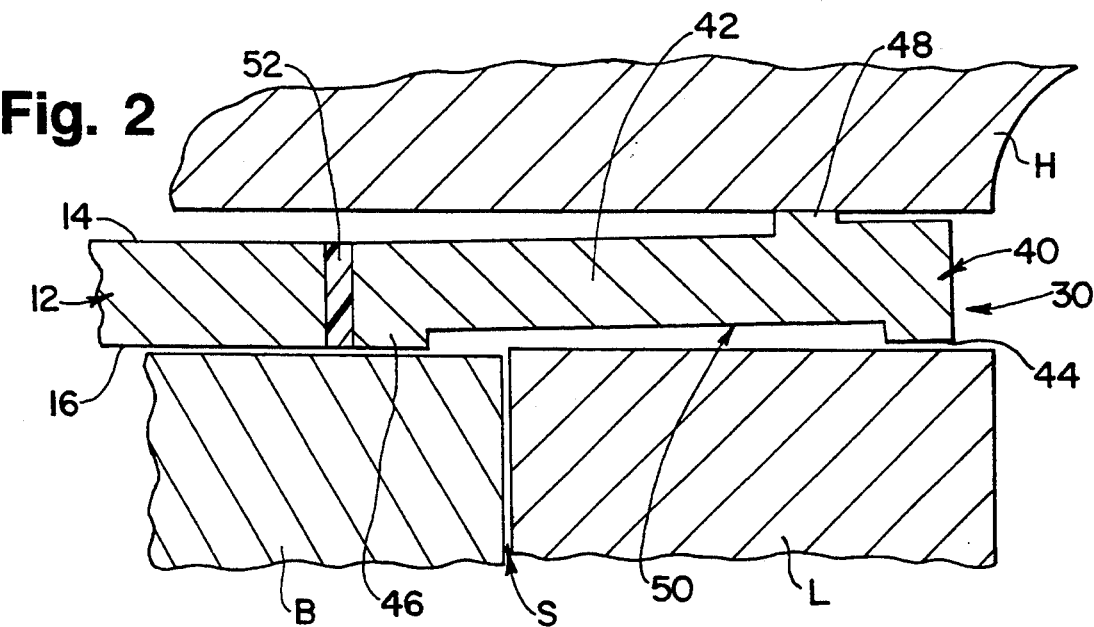
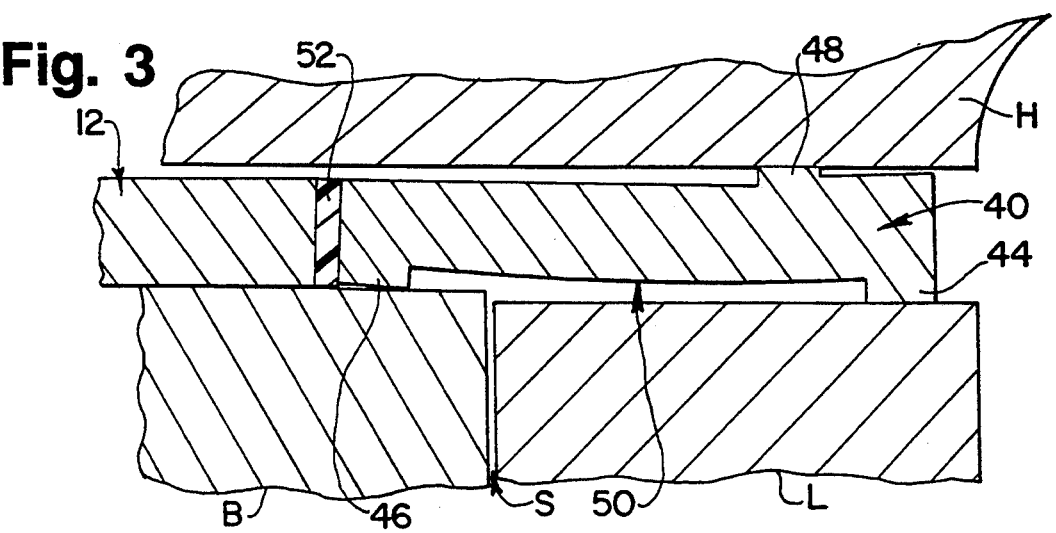

BEAM FUNCTIONING FIRE RING

BACKGROUND OF THE INVENTION

In U.S. Pat. No. 4,796,897, a beam functioning fire ring is disclosed for use in association with a conventional gasket body. It is shown in an environment in which the fire ring is adapted to be supported on a cylinder sleeve or liner and is joined with the gasket body in a conventional manner.

Typically, the joint between the gasket body and fire ring is provided with a sealant which may both secure them and provide a seal against flow of a coolant from the zone or space between the liner and the block. One problem with relying on such a sealant to provide a seal is that the heat in that zone tends to degrade the sealant, ultimately resulting in a failure of the gasket.

It would be desirable to reduce the dependence on such sealants in effecting a seal around the liner, while retaining the sealing advantages of beam functioning fire rings.

SUMMARY OF THE INVENTION

In accordance with the present invention an improved sealing system for an internal combustion engine having cylinder liners is provided. To that end, an internal combustion engine assembly including a head, a block assembly, preferably defining one or more cylinders and a liner in each cylinder, each cylinder and liner defining a liquid filled annulus, is provided with an improved gasket. The gasket assembly has an expansive main gasket body having upper and lower main surfaces and is adapted to be disposed between the head and the block. The gasket body defines a plurality of openings, including a plurality of combustion openings, fluid openings and bolt holes, and has an annular beam functioning fire ring positioned and disposed in each combustion opening.

Each beam functioning fire ring comprises, in radial cross-section, an annular beam, an annular bead projecting from the beam in a first vertical direction and annular support feet projecting from the beam in the opposite vertical direction. The feet straddle and define an annular recess therebetween. The bead is disposed above the recess and between the feet and is offset radially inwardly of the recess from the vertical projection of each foot by a distance at least equal to at least one half of the radial width of the bead. At least a first foot is supported on the upper surface of the liner and a second foot is supported on the block. The first foot provides a combustion seal and the second foot provides a liquid seal to prevent liquid from the annulus from passing over the main body.

In a preferred form, the beam is at least 10% thicker in the zone over the first foot than over the second foot. The beam may gradually diminish in thickness from the beam to the second foot. Desirably means for attaching the fire rings to the gasket body are provided.

In a preferred form, a third annular support foot projects downwardly from the beam and the third foot is disposed between the first and second feet. The third foot is supported on the liner and is spaced radially away from the vertical projection of the bead by a distance greater than the first foot is spaced away from the vertical projection of the bead.

Further objects, features and advantages of the present invention will become apparent from the following description and drawings.

BRIEF DESCRIPTION OF THE DRAWINGS

FIG. 1 is a plan view of a head gasket assembly employing a beam-functioning fire ring in accordance with the present invention;

FIG. 2 is an enlarged cross-sectional view of the fire ring portion of the gasket of FIG. 1, taken substantially along line 2—2 of FIG. 1, and illustrating the gasket assembly juxtaposed with an internal combustion engine;

FIG. 3 is a view like FIG. 2, but of the fire ring under load;

DESCRIPTION OF A PRESENTLY PREFERRED EMBODIMENT

Figure 4:
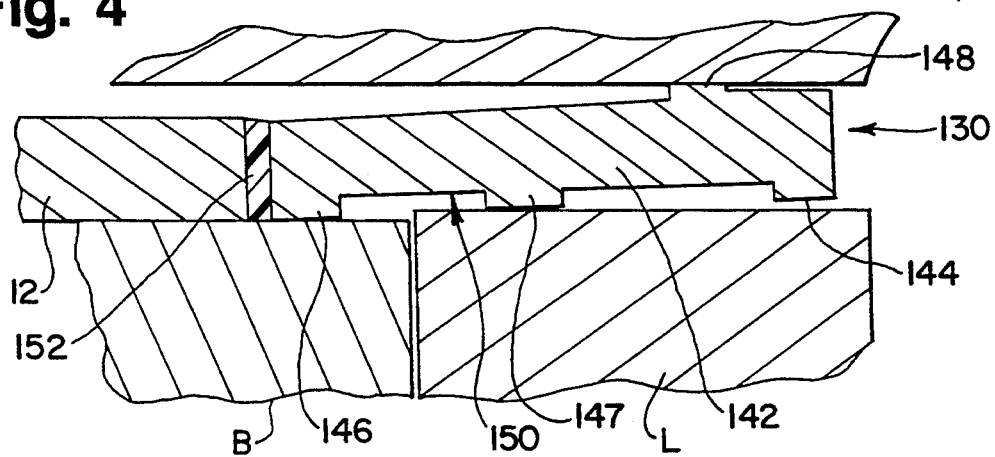
FIG. 4 is a view like FIG. 2, but of a further embodiment of the present invention.

Referring now to the drawings, FIG. 1 illustrates a typical head gasket assembly with which the beam functioning fire ring of the present invention may be employed. Thus, head gasket assembly 10 comprises a main gasket body 12 having two main surfaces, upper and lower main surfaces 14, 16, and a plurality of combustion openings 18 which are armored in accordance with the present invention.

Main gasket body 12 may be a metal body, as of cold rolled steel. Alternatively, it may comprise a plurality of laminated layers, such as a metallic central core and a pair of outer, conventional fiber-elastomer facing layers which provide the upper and lower main surfaces.

The dimensions and materials of the main gasket body may vary, as may be the adjuncts and sealing aids used therewith.

Gasket 10 defines a plurality of suitable openings, such as fluid (oil and water) openings 24, as well as a plurality of bolt holes 26 for the purposes described in U.S. Pat. No. 3,565,449. The water and oil openings 24 extend through the main gasket body and are intended to provide passageways through the gasket assembly 10. However, they are to be sealed, as with conventional sealing aids of the type described in U.S. Pat. No. 4,796,897, so that water and/or oil will not spread beyond the openings 24.

Figure 6:
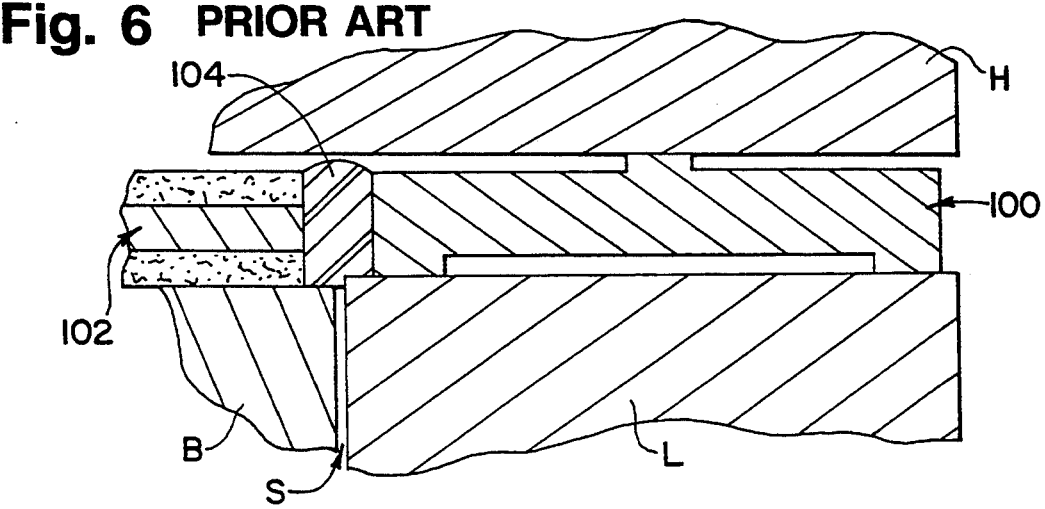
FIG. 6 is a view like FIG. 2, but of a prior art construction.

As shown in FIG. 6, a typical prior art use of a beam functioning fire ring 100 in accordance with U.S. Pat. No. 4,796,897, positions it on a sleeve or liner L. It is joined with a main gasket body 102 by a sealing bead 104, as of a silicone elastomer, which both joins the fire ring 100 to the gasket body, and seals the space S between the liner L and block B so that coolant or other liquid in the annulus space S does not escape therefrom and does not, therefore spread into the zone sealed by the gasket body 102. The bead 104 is exposed to high temperatures, and over a period of time may degrade, sometimes resulting in leakage.

In practical applications, mismatch between liner L and block B means bead 104 must seal at more than one height. As the bead stiffens with exposure to temperature and the components move with thermal expansion and contraction due to startup and shutdown, as well as vibration due to dynamic motion during engine operation variations (at high speed, and/or high loads), the gap seal becomes more difficult to maintain.

The positioning and structure of the beam functioning fire ring 30 of the present invention avoids such problems, and avoids the dependency of the sealing system upon a sealing bead such as sealing bead 104.

Thus, as shown in FIG. 2, the beam functioning fire ring 30 may be an annulus 40 positioned and disposed in a gasket combustion opening 18 and in vertical transverse cross-section comprises a beam section 42, a pair of perimetric feet 44, 46, projecting from one side of the annulus in a first direction and a control bead 48 projecting from the other side of the annulus in a second direction. It will be apparent that the inner foot 44 is of a first mean diameter and that the other or outer foot 46 is of a second greater mean diameter than the first diameter. A recess 50 extends between the support feet and below the bead. As seen in FIG. 2, the recess extends laterally by a distance of at least half of the width of the vertical projection of the bead, beyond the bead 48 on each side of the bead 48.

As such, it will be apparent that the beam section 42 may be stressed and deflected from its straight or rectilinear configuration as illustrated in FIG. 2 when the bolts (not shown) passing through openings 26 and securing the head H and block B of the internal combustion engine are drawn together from the position illustrated in FIG. 2 to the position of FIG. 3.

It will also be seen from the drawings that the fire ring 30 is positioned to straddle the gap or space S between the block B and liner L. The bead 48 is positioned closer to foot 44 than to foot 46. Additionally, the body of the beam section is thicker in the zone of the foot 44 than it is elsewhere where it tapers and reduces in thickness from the bead 48 to the zone of foot 46. Under loading, as illustrated by FIG. 3, the bead 48 and foot 44 contribute to producing a highly effective combustion seal while the foot 46, which is seated on the block B, serves to effect a highly effective seal against passage of liquid outwardly of the gasket body 12. The gasket body 12 and fire ring 30 may be joined, as by a bead 52 as of silicone rubber, or at selected locations only on the circumference where the operating temperatures will not degrade the bead 52. Further, even if the bead degrades, because it is not depended upon to act as a seal, and only acts as an attachment means, degradation thereof will not destroy the effectiveness of the overall gasket assembly.

A typical beam functioning fire ring 30 in accordance with the embodiment of FIGS. 2 and 3 is one having an outer diameter of 5.862 inches. In a radial cross section, the fire ring is 0.275 inch in width. The feet are 0.034 inch wide and 0.01 inch high and the control bead is 0.03 inch wide. The bead 48 is spaced 0.22 inch in vertical projection away from foot 44. The thickness of the beam is 0.0625 inch over foot 44, 0.0475 inch on the other side of the foot 44, and tapers to 0.042 inch over the foot 46. Preferably, the ring 30 is a made of cold rolled steel which is coated with a layer of copper about 0.5 to 1.5 mils thick. The thickness of the beam is at least 10% greater at the liner than at the block, and preferably is at least 15% thicker thereat.

Thus, the fire ring deployed as described will serve to provide both a combustion seal and a coolant seal. Positioning the control bead 48 away from the block foot 46 and closer to the liner foot 44 also improves the load balance between the combustion and coolant sealing stress requirements. Similarly, the use of a somewhat thicker beam section adjacent the liner foot provides greater stiffness where the sealing stress requirements are greater, and the thinner beam section adjacent the block foot allows effective sealing where the stress requirements are less. Further, where the elevations of the block liner are not equal, the reduced thickness of the fire ring 30 over the recess and foot 46 accommodates to the greater height of the block, without interfering with the head and without upsetting the combustion sealing stress requirements.

Finally, the thicker beam section adjacent the liner foot functions as a compression stop under extreme loads such as thermal crush, protecting the fire ring and gasket against undesired distortion in use. This function of the fire ring of the present invention applies both to the embodiment of FIGS. 2 and 3, as well as that of FIGS. 4 and 5.

Figure 5:
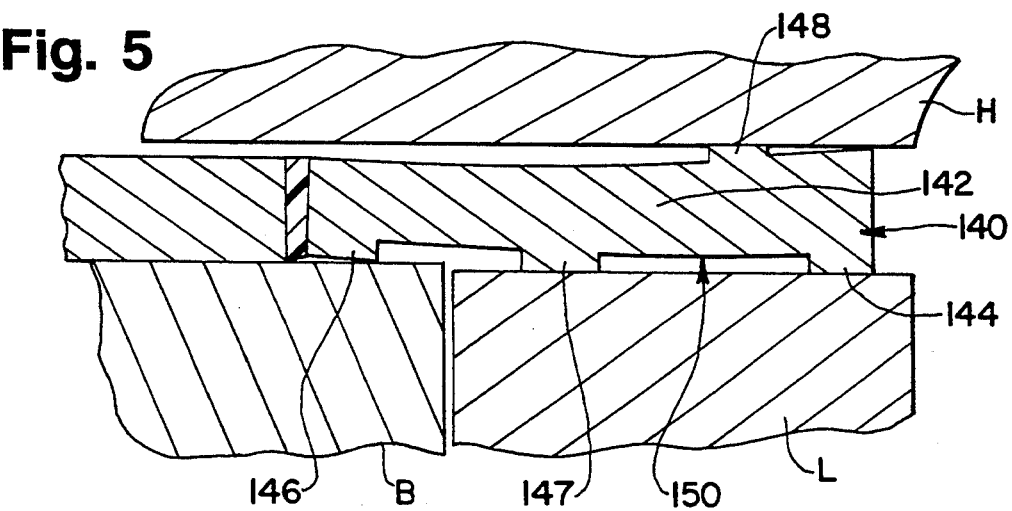
FIG. 5 is a view like FIG. 4, but of the fire ring under load.

Referring now to the embodiment of FIGS. 4 and 5, fire ring 130 is, like fire ring 30, located in the gasket combustion opening and is positioned to straddle the space S between block B and liner L. Fire ring 130 comprises, in vertical transverse cross-section, a beam section 142, a plurality of annular feet 144, 146 and 147 projecting from one side of the beam section 142 and a control bead 148 projecting from the other side of the beam section 142. A recess 150 interrupted by the central foot 147 extends between support feet 144 and 146. The recess 150 extends laterally beyond the bead on each side of the bead.

As may be seen in FIGS. 4 and 5, foot 144 is closer to bead 148 than is central foot 147. Further, the body of the beam section 142 is thicker in the zone of foot 144 than it is in the zone of foot 147, and especially than it is in the zone of foot 146. Under loading, the bead 148 and feet 144 and 147 (which are seated on the liner L) contribute to producing a highly effective combustion seal, while the foot 146 which is seated on the block B, serves to produce a highly effective seal against passage of liquid outwardly of the gasket body 12. The gasket body 12 and fire ring 130 may be joined by a bead 152 (like bead 52) or at selected locations only. As is the case with bead 52, bead 152 is not relied on for sealing purposes.

The fire ring disposed as described provides both a combustion seal and a coolant seal. By providing greater stiffness over the liner and by providing a pair of feet adjacent the bead, a highly effective combustion seal is provided. Because the liquid (coolant) seal does not require as much sealing stress, the thinner body and the remoteness of the foot 146 from the bead 148, do provide an effective liquid seal. The structure of the fire ring and the location of its components divide the available stress in a highly efficient manner. The dimensions also serve to avoid interfering with the bead and therefore avoid upsetting the sealing stress requirements.

The dimensions of the fire ring of the present invention may vary, taking into consideration, however, that the ring must have a portion which functions as a beam, must have a projecting bead and a significantly wider recess, and that it defines a loading curve which preferably progressively functions first under load as a beam, next elastically under a relatively low load, and thereafter, when desired, in a plastic deformation mode under a higher load, and finally, under extreme load, protects its functionality with the integral compression stop provided by the annular shoulder.

The recess width in the annulus is at least twice the control bead width. The bead height is preferably no more than 60% of the height of the recess. The bead is spaced inwardly of the edge of the recess a distance at least equal to half the width of the bead.

Although the fire ring of the present invention is especially useful with a linered engine, in which it serves to seal both combustion gases and liquids, the principles may be applied to a non-linered engine, to balance the loads by adjusting the stiffness of the ring by increasing the thickness at one side which may also serve as a compression stop.

It will be apparent to those skilled in the art that further modifications may be made without departing from the spirit and scope of the present invention. Accordingly, the claims are intended to embrace all modifications within their scope.

What is claimed is:

1. An internal combustion engine assembly including a head, a block defining at least one cylinder and a liner in each cylinder and said block and said liner defining a liquid filled annulus, and a gasket assembly comprising an expansive main gasket body having upper and lower main surfaces adapted to be disposed between said head and block, said gasket body defining a plurality of openings, including at least one combustion opening, fluid openings and bolt holes, and an annular beam functioning fire ring positioned and disposed in each combustion opening, each beam functioning fire ring comprising, in radial cross-section, an annular beam, an annular bead projecting from the beam in a first vertical direction and annular support feet projecting from the beam in the opposite vertical direction, said feet straddling and defining an annular recess therebetween, said bead being disposed above said recess and between said feet and being offset radially inwardly of said recess from the vertical projection of each foot by a distance at least equal to one half of the radial width of said bead, with at least a first foot being supported on the upper surface of said liner and a second foot being supported on said block, said first foot providing a combustion seal and said second foot providing a liquid seal to prevent liquid from said annulus from passing over said main body.

2. The engine assembly of claim 1, and wherein said beam is at least 10% thicker in the zone over said first foot than over said second foot.

3. The engine assembly of claim 2, and further including means for attaching each said fire ring to said gasket body.

4. The engine assembly of claim 1, and wherein a third annular support foot projects from the beam in said opposite vertical direction, and said third foot is disposed between said first and second feet, said third foot being supported on said liner and being spaced radially away from the vertical projection of said bead by a distance greater than the distance the first foot is spaced away from the vertical projection of said bead.

5. The engine assembly of claim 1, and wherein said beam diminishes in thickness from said bead to said second foot.

6. A gasket assembly for an internal combustion engine having a head, a block defining at least one cylinder and a liner in each cylinder, said gasket assembly comprising an expansive main gasket body defining at least one combustion opening and a beam functioning fire ring attached to said gasket body in each said combustion opening, each fire ring comprising, in radial cross-section, a beam, a bead projecting upwardly from the beam for acting against a head of an engine, and a pair of feet extending downwardly from the beam, one at each end of the beam and thereby defining an annular recess between the feet, with the vertical projection of said bead being substantially closer to one foot than to the other foot, and said beam thickness being at least 10% greater on the side of the bead adjacent said one foot than on the other side of the bead, and wherein said one foot is adapted to be supported on a liner and said other foot is adapted to be supported on a block.

7. A gasket assembly in accordance with claim 6, and wherein the distance between the vertical projection of said other foot and said bead is at least twice the distance between the vertical projection of said one foot and said bead.

8. A gasket assembly in accordance with claim 7, and further including a third foot, said third foot being in said recess on the side of the bead opposite said one foot, and being spaced radially away from the vertical projection of said bead by a distance greater than the distance said one foot is spaced away from the vertical projection of said bead.

9. A gasket assembly for an internal combustion engine having a head and a block assembly including at least one cylinder, said gasket assembly comprising an expansive main gasket body defining at least one combustion opening and a beam functioning fire ring attached to said gasket body in each said combustion opening, each fire ring comprising, in radial cross-section, a beam, a bead projecting upwardly from the beam for acting against a head of an engine, and a pair of feet extending downwardly from the beam, one at each end of the beam and thereby defining an annular recess between the feet, with the vertical projection of said bead being substantially closer to one foot than to the other foot, said one foot being of a first diameter and said other foot being of a second diameter greater than the first diameter, and said beam thickness being at least 10% greater on the side of the bead adjacent said one foot than on the other side of the bead, and wherein said feet are adapted to be supported on said block assembly.

10. A gasket assembly in accordance with claim 9, and wherein the distance between the vertical projections of said other foot and said bead is at least twice the distance between the vertical projection of said one foot and said bead.

11. A gasket assembly in accordance with claim 10, and further including a third foot, said third foot being in said recess on the side of the bead opposite said one foot, and being spaced radially away from the vertical projection of said bead by a distance greater than the distance said one foot is spaced away from the vertical projection of said bead.

12. A gasket assembly in accordance with claim 9, and wherein said beam diminishes in thickness from said bead to said other foot.

* * * * *